(12) United States Patent
Gillmor et al.

(10) Patent No.: US 10,640,622 B2
(45) Date of Patent: May 5, 2020

(54) METHOD FOR PROVIDING TEXTURED, POROUS POLYMERIC FILMS

(71) Applicant: Eastman Kodak Company, Rochester, NY (US)

(72) Inventors: Jeffrey R. Gillmor, Brockport, NY (US); Silas Owusu-Nkwantabisah, Brockport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 311 days.

(21) Appl. No.: 15/860,716

(22) Filed: Jan. 3, 2018

(65) Prior Publication Data

US 2019/0203008 A1   Jul. 4, 2019

(51) Int. Cl.
| | | |
|---|---|---|
| *C08J 9/12* | (2006.01) | |
| *C08J 9/36* | (2006.01) | |
| *B29C 44/02* | (2006.01) | |
| *C08J 5/18* | (2006.01) | |
| *B29D 7/01* | (2006.01) | |
| *C08J 9/00* | (2006.01) | |

(52) U.S. Cl.
CPC ............... *C08J 9/122* (2013.01); *B29C 44/02* (2013.01); *B29D 7/01* (2013.01); *C08J 5/18* (2013.01); *C08J 9/36* (2013.01); *C08J 9/0061* (2013.01); *C08J 9/0066* (2013.01); *C08J 2203/06* (2013.01); *C08J 2203/08* (2013.01); *C08J 2205/05* (2013.01); *C08J 2205/052* (2013.01); *C08J 2327/16* (2013.01); *C08J 2333/12* (2013.01); *C08J 2427/12* (2013.01)

(58) Field of Classification Search
CPC . B29C 67/20; B29C 44/3469; B29C 44/3473; B29C 44/3476; B29C 44/348; B29C 2043/3668; B29C 59/02; B29C 66/727; B29C 66/81241; B29C 44/02; B29C 44/00; B29C 44/005; B29C 44/356; B29C 45/14795; B22F 3/11; B22F 3/1125; B22F 2003/1128; C08J 9/122; C08J 5/18; C08J 9/36

See application file for complete search history.

(56) References Cited

U.S. PATENT DOCUMENTS 6,790,870 B1   9/2004   DeSimone et al.
8,828,302 B2   9/2014   Khine et al.

OTHER PUBLICATIONS

Srinivas Siripurapu et al., "Surface-Constrained Foaming of Polymer Thin Films with Supercritical Carbon Dioxide," Dec. 2, 2004, Macromolecules 2004, 37, 9872-9879.
Ana Catarina Trindade et al., "Tuning surface wrinkles of Janus spheres in supercritical carbon dioxide," J. of Supercritical Fluids 120 (2017) 125-131.

(Continued)

*Primary Examiner* — Stella K Yi
(74) *Attorney, Agent, or Firm* — J. Lanny Tucker

(57) ABSTRACT

Textured and porous organic polymeric films can be obtained by subjecting organic polymeric films that are swellable in carbon dioxide, to supercritical carbon dioxide while such films are under an atmospheric pressure of at least 73 bar and an applied physical force of at least 0.05 Newtons. The textured and porous organic polymeric films have surface wrinkles having an average peak to valley height of at least 1 μm and up to and including 3,000 μm, and a porosity of at least 10%.

11 Claims, 6 Drawing Sheets

(56) References Cited

OTHER PUBLICATIONS

M. H. Godinho et al., "tuneable micro-and nano-periodic structures in a free-standing flexible urethane/urea elastomer film," Eur. Phys. J. E. 21, 319-330 (2006).
S. G. Kazarian, "Polymer Processing with Supercritical Fluids," Polymer Science, Ser. C. vol. 42. No. 1, 2000, pp. 78-101.
Hong-Gyu Park et al., "Control of the wrinkle structure on surface-reformed poly(dimethylsiloxane) via ion-beam bombardment," www.nature.com/scientificreports, 5:12356, D01:10.1038/srep12356.

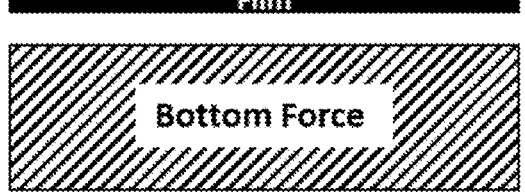
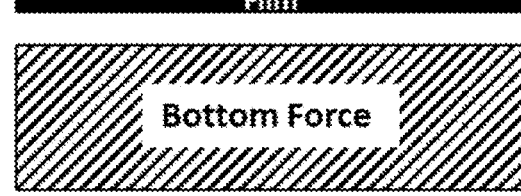
Fig. 1A                    Fig. 1B

METHOD FOR PROVIDING TEXTURED, POROUS POLYMERIC FILMS

FIELD OF THE INVENTION

This invention relates to a method for creating organic polymeric films that have internal pores and outer surface texture or "wrinkles, using physical pressure and supercritical carbon dioxide ($scCO_2$). The method involves subjecting a non-porous, non-textured organic polymeric film to $scCO_2$ while it is under physical force of at least 0.05 Newtons for a time sufficient to allow infusion of the $scCO_2$ into the film, thereby causing the film to swell. Once the $scCO_2$ and physical force are removed, the resulting organic polymeric film has a surface texture (wrinkles) and internal pores (or voids).

BACKGROUND OF THE INVENTION

Methods for making foamed articles such as porous polymeric thermoplastic films are well known and include the use of chemical and physical blowing agents. The chemical blowing agents typically decompose at a critical temperature and release a gas within the polymeric films. Physical blowing agents typically are dissolved within the polymeric material and then precipitated to form a foamed structure. The use of such blowing agents has been increasingly discouraged due to potential environmental hazards.

Foaming semi-crystalline polymers using a mixture of thermoplastic polymers and a blowing agent is described for example in U.S. Pat. No. 6,790,870 (DeSimone et al.). Carbon dioxide in liquid, gaseous, or supercritical phase is used as a suitable blowing agent.

Foaming of poly(methyl methacrylate) films using supercritical carbon dioxide ($scCO_2$) is also described by Siripurapu et al. in *Macromolecules,* 2004 37, 9872-9879 to provide articles with uniform porosity but "thin unfoamed skins" (Conclusion, page 9878).

U.S. Pat. No. 8,828,302B2 (Khine et al.) describes the preparation of thin thermoplastic films having wrinkled surfaces using various methods including treatment with an oxygen plasma while opposite surfaces of the film are constrained. The surface wrinkles can be on the nano- or micrometer scale and can be used as supporting material for cell growth in biological applications.

Trindade et al. in *J. of Supercritical Fluids* 2017, 217, 125-131 describe the preparation of Janus spheres having wrinkled surfaces of periodic patterns using a multi-step process of UV irradiation and swelling with $scCO_2$. It was found, however, that the generated wrinkles could be erased with time and temperature. The authors also allege that the specific polymer composition affects the type of wrinkled surface (Conclusions, page 130).

It is desirable to find a way to create a porous organic polymeric film that also has a wrinkled or textured surface. It is this problem that is solved by the present invention.

SUMMARY OF THE INVENTION

The present invention provides a method for providing a textured and porous polymeric film, comprising the steps of, in order:

A) providing an organic polymeric film having first and second opposing surfaces and a dry thickness of less than 1 mm, and that is composed of a material that is swellable with supercritical carbon dioxide;

B) applying a physical force to at least a partial surface area of both the first and second opposing surfaces of the organic polymeric film of at least 0.05 Newtons;

C) subjecting the organic polymeric film to supercritical carbon dioxide under a pressure of at least 73 bar and a temperature of at least 31° C. for a time sufficient to swell the organic polymeric film with the supercritical carbon dioxide;

D) removing the supercritical carbon dioxide; and

E) after D) has begun or has been completed, removing the physical force from the at least partial surface area of both the first and second opposing surfaces, to provide a textured and porous organic polymeric film having:

a) textured first and second opposing surfaces in the at least partial surface area, having wrinkles having an average peak to valley height of at least 1 μm and up to and including 3,000 μm, and b) a porosity of at least 10% provided by pores between the first and second opposing surfaces, the porosity being based on the total final volume of the textured and porous organic polymeric film.

The present invention provides several advantages. The use of the physical force with the $scCO_2$ allows a person to define the textured and porous regions in an organic polymeric film in a predetermined fashion. On the contrary, typical known $scCO_2$ processes tend to yield uniformly porous films or products without giving the user the option of defining regions of interest for porosity while leaving other regions non-porous. Secondly, the present invention offers facile control of the morphology of the wrinkle patterns by the selection of the shape of the organic polymer film or by the shape of the surface of the physical force in contact with the film. Conversely, known methods typically produce either random or straight-line patterns, such as that described in U.S. Pat. No. 8,828,302B2 and *J of Supercritical Fluids* 2017, 217, 125-131, both cited above. Thirdly, the use of $scCO_2$ according to the present invention to create simple and complex textured and porous designs is attractive since the CO2 is an environmentally friendly and benign chemical, cheap, free of post-process extractions and precipitation, and allows for a facile control of the foam porosity.

BRIEF DESCRIPTION OF THE DRAWINGS

FIGS. 1A and 1B are schematic, cross-sectional views showing how the same or different amounts of opposing physical forces can be applied to an organic polymeric film according to the present invention.

DETAILED DESCRIPTION OF THE INVENTION

Figure 2:
FIG. 2 is a black-and-white photographic image of textured and porous organic polymeric film provided according to the present invention, as described in Invention Example 1 below.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described and the discussion of any embodiment.
Definitions As used herein to define various components or materials used in the practice of this invention, unless otherwise indicated, the singular forms "a," "an," and "the" are intended to include one or more of the components or materials (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted to have a standard dictionary meaning.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges may be useful to achieve substantially the same results as the values within the ranges. In addition, the disclosure of these ranges is intended as a continuous range including every value between the minimum and maximum values as well as the end points of the ranges.

Supercritical carbon dioxide (or $scCO_2$) is meant to describe carbon dioxide in the supercritical state or phase as is understood by those skilled in the art.

Porosity (%) of the articles (textured and porous organic polymeric films) provided by the present invention can be measured by mercury porosimetry or pycnometry and refers to the percentage of total final volume of the textured and porous organic polymeric film.

As used herein, the term "open pores" refers to discrete microvoids, nanovoids, or pores within the textured and porous polymeric film that are open to a surface. The term "closed pores" refers to discrete microvoids, nanovoids, or pores that are completely enclosed within the organic polymeric film structure. In most instances, both the closed pores and open pores are "discrete," meaning that they are not interconnected to provide a void network.
Inventive Method The present invention is carried out using at least essential features or steps A) through E) described below, in that order, of steps. Thus, in some embodiments, the method of the present invention consists essentially of A) through E), but in other embodiments, optional features or steps may be included.

The inventive method requires A) the provision of a suitable organic polymeric film (hereinafter also "film" or "polymeric film") that can be in the form of a single-layer film (single organic polymeric layer), or it can be a laminated structure that comprises two or more individual layers or films, for example, two or more organic polymeric films of different compositions. Each of such films has first and second opposing surfaces composed of a suitable organic chemical material (such as those described below), or a composite of multiple chemical materials as described below. In most instances, such films are planar in form and the first and second surfaces are "first and second opposing surfaces," but some films can have a non-planar or curved shape. For example, a non-planar film can be provided in the form of a cylindrical rod, a cone-like shape, a shape containing one or more polyhedral figures, or other complex shapes containing one or more curved surfaces having at least a first surface.

The noted film generally has a dry thickness of less than 1 mm, and any dry thickness can be used as long as the purpose of the resulting textured and porous organic film is preserved. Typically, the minimum dry film thickness is at least 0.005 mm.

The film composition can comprise one or more thermoplastic or thermoset organic polymeric materials such that the film is swellable with $scCO_2$ to an appreciable degree. Useful organic polymeric materials can be semi-crystalline or amorphous, and they can be homopolymers having the same recurring units, or copolymers having two or more different recurring units. In most embodiments, the composition of the film is generally amorphous or semi-crystalline and homogeneous in nature. However, in some embodiments, the film can be heterogeneous in nature and comprise one or more organic polymers as defined herein as well as organic or inorganic particulate filler materials (examples described below).

A variety of organic polymeric materials meet the requirements for an organic polymeric film according to the present invention, including but not limited to, poly(methyl methacrylate) and other acrylate and methacrylate polymers including both homopolymers and copolymers derived using these and other monomers; poly(vinyl chloride); polyolefins including high and low density polyethylene and high and low density polypropylene); nylons; fluoropolymers such as poly(vinylidene fluoride) or a copolymer derived in part from vinylidene fluoride, poly(vinyl fluoride), polytetrafluoroethylene, polychlorotrifluoroethylene, and polyhexafluoroisobutylene; polyurethanes; polystyrenes; polycarbonates; polyurethanes; polyesters such as polyethylene terephthalate and polyethylene naphthalate; cellulosic polymers; and acrylic resins. Homogeneous or heterogeneous blends or mixtures of two or more of such organic polymeric materials can be used if desired. Poly (vinylidene fluoride) and blends of fluorinated organic polymers are particularly useful.

Where the organic polymeric film is a "composite" of one or more of the noted organic polymers, it can also include particles of one or more organic or inorganic fillers including, but not limited to, zinc oxide, barium titanium oxide, carbon black, lead zinc titanate, silica, calcium carbonate, calcium phosphate, titanium dioxide, and calcium stearate.

A physical force is applied to at least a partial surface area of both first and second opposing surfaces of the organic polymeric film in feature B). Such physical force is generally applied in an opposing fashion so that the organic polymeric film is pressed between the two opposing surfaces. Such physical force is at least 0.05 Newtons, or even at least 0.1 Newtons, and generally up to and including 10 Newtons, on either or both sides of the organic polymeric film. A particularly useful physical force can be at least 0.1 Newtons and up to and including 1.5 Newtons.

This physical force can be applied in any suitable manner, for example, by applying standard brass weights, stainless steel, or aluminum plates on the organic polymeric film, perpendicular to the plane of the organic polymeric film and sitting horizontally relative to the base of a scCO$_2$ chamber. Combinations of these means can be used if desired. Alternatively, the organic polymeric film can be sandwiched between two aluminum plates and placed vertically in a scCO$_2$ chamber. The organic polymeric film can also be rolled around a cylindrical substrate and followed by another outer covering impervious to the scCO$_2$. See FIGS. 1A and 1B as options for physical forces that can be applied to both sides of the organic polymeric film. FIG. 1A illustrates equal physical forces applied to opposing sides of the organic polymeric film, and FIG. 1B shows unequal physical forces applied to opposing sides of the organic polymeric film.

Once the physical force has been applied, C) the organic polymeric film is subjected to an environment of scCO$_2$ under a pressure of at least 73 bar and up to and including 600 bar and at a temperature of at least 31° C. and up to and including 300° C. for a time sufficient to allow the scCO$_2$ to permeate (swell or infuse) the organic polymeric film to form a "treated film." This process could take at least 5 minutes and up to and including 24 hours.

Once sufficient exposure to scCO$_2$ has been achieved, D) the scCO$_2$ is removed from the treated film, and after scCO$_2$ removal has begun or has been completed, E) the applied physical force is also removed (or released) from the at least partial surface area of both the first and second opposing surfaces of the treated film.

The result is a textured and porous organic polymeric film that has both (a) textured first and second opposing surfaces in the at least partial surface area (that is, where the physical force had been applied) with wrinkles having an average peak to valley height (amplitude) of a least 1 µm and up to and including 3,000 µm, or of at least 25 µm and up to and including 1,500 µm; and (b) a porosity of at least 10%, or even at least 20% and up to and including 80%, provided by discrete pores between the first and second opposing surfaces. The porosity is based on the total final volume of the textured and porous organic polymeric film.

In some embodiments, the resulting textured and porous organic polymeric film has both open pores and closed pores, whereas in other embodiments, the textured and porous organic polymeric film comprises predominantly discrete or individual closed pores. By predominantly, it is meant that at least 90% of the total pores are closed pores.

In the practice of the present invention, it is generally useful after E) to cool the textured and porous organic polymeric film to a temperature that is less than the temperature used in C). This cooling process can be carried out by (a) exposing the scCO$_2$ chamber to a cold-water bath or jacket; or (b) by taking the textured and porous organic polymeric film and the attached physical force out of the scCO$_2$ chamber and exposing it to a cold bath such as ice or water bath.

In the practice of this invention, the organic polymeric film can be disposed in a suitable fashion on a substrate that is not swellable by supercritical carbon dioxide under the conditions of C). Such substrates can be composed of for example, stainless steel, aluminum sheets, Kapton, and glass. A substrate can be used to provide increased physical integrity to the organic polymer film both during and after the method is carried out. It may be useful for the substrate to be present during the method and then for it to be removed (for example, peeled away) after the method is carried out.

At least the following embodiments are provided by this invention:

1. A method for providing a textured and porous polymeric film, comprising the steps of, in order:

A) providing an organic polymeric film having first and second opposing surfaces and a dry thickness of less than 1 mm, and that is composed of a material that is swellable with supercritical carbon dioxide;

B) applying a physical force to at least a partial surface area of both the first and second opposing surfaces of the organic polymeric film of at least 0.05 Newtons;

C) subjecting the organic polymeric film to supercritical carbon dioxide under a pressure of at least 73 bar and a temperature of at least 31° C. for a time sufficient to swell the organic polymeric film with the supercritical carbon dioxide;

D) removing the supercritical carbon dioxide; and

E) after D) has begun or has been completed, removing the physical force from the at least partial surface area of both the first and second opposing surfaces, to provide a textured and porous organic polymeric film having:

a) textured first and second opposing surfaces in the at least partial surface area, having wrinkles having an average peak to valley height of at least 1 µm and up to and including 3,000 µm, and b) a porosity of at least 10% provided by pores between the first and second opposing surfaces, the porosity being based on the total final volume of the textured and porous organic polymeric film.

2. The method of embodiment 1, wherein the textured and porous organic polymeric film is cooled to a temperature that is less than the temperature used in C).

3. The method of embodiment 1 or 2, wherein the organic polymeric film is disposed on a substrate that is not swellable by supercritical carbon dioxide under the conditions of C).

4. The method of any of embodiments 1 to 3, wherein the organic polymeric film is composed of one or more amorphous or semi-crystalline polymers.

5. The method of any of embodiments 1 to 4, wherein the organic polymeric film is composed of poly(vinylidene fluoride) or a copolymer derived in part from vinylidene fluoride, an acrylate homopolymer or copolymer, a polycarbonate, a polyurethane, or a blend of two or more of such polymers.

6. The method of any of embodiments 1 to 5, wherein the organic polymeric film is a composite composed of one or more organic polymers and an inorganic or organic filler material.

7. The method of any of embodiments 1 to 6, wherein the textured and porous organic polymeric film comprises both open pores and closed pores.

8. The method of any of embodiments 1 to 6, wherein the textured and porous organic polymeric film comprises predominantly closed pores.

9. The method of any of embodiments 1 to 8, wherein the organic polymeric film comprises a single organic polymeric layer.

10. The method of any of embodiments 1 to 8, wherein the organic polymeric film comprises a laminate of two or more organic polymeric films of different composition.

11. The method of any of embodiments 1 to 10, wherein the textured first and second opposing surfaces in the at least partial surface area have wrinkles having an average peak to valley height of at least 25 μm and up to and including 1500 μm.

The following Examples are provided to illustrate the practice of this invention and are not meant to be limiting in any manner.

INVENTION EXAMPLE 1

Formation of Textured and Porous PVDF film Using a Flat Film Conformation

The method of the present invention was carried out in a stainless-steel high-pressure vessel with a dry 25 μm thick PVDF film that was textured and foamed using $scCO_2$ and physical force applied to the PVDF film.

Specifically, the dry PVDF film was sandwiched between parallel plates inside the noted high-pressure vessel with the PVDF film being parallel to the cross-section of the cylindrical pressure vessel. A physical force was applied to the PDVF film by adding standard brass weights to the first surface to yield 1.11 N physical force (see schematic illustration in FIG. 1B). The opposing surface of the PDVF film was also constrained by a stainless-steel plate.

The high-pressure vessel was then sealed and filled with $CO_2$ gas under pressure and the pressure inside the high-pressure vessel was maintained at 120±2 bar over the course of the experiment. The temperature inside the high-pressure vessel was monitored and maintained at 100° C. for 2 hours.

Subsequently, the high-pressure vessel was rapidly depressurized (at approximately 120 bar/second) by opening a valve to release the contained $CO_2$, and it was rapidly cooled with running cold (at approximately 10° C.) tap water. The applied physical force was then removed to obtain an opaque textured and porous organic polymeric film having textured first and second opposing surfaces in the surface area where the physical force had been applied (see black-and-white photographic image in FIG. 2) wherein the surface wrinkles had an average peak to valley height of about 29 μm and the porosity was about 80%.

Figure 3A:
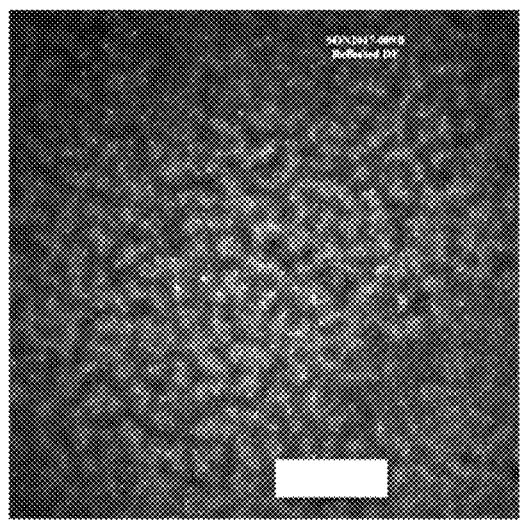
FIGS. 3A, 3B, and 3C are black-and-white optical micrographs of the surface of textured and porous organic polymeric films obtained according to the present invention as described in Invention Example 1 below.
Figure 3B:
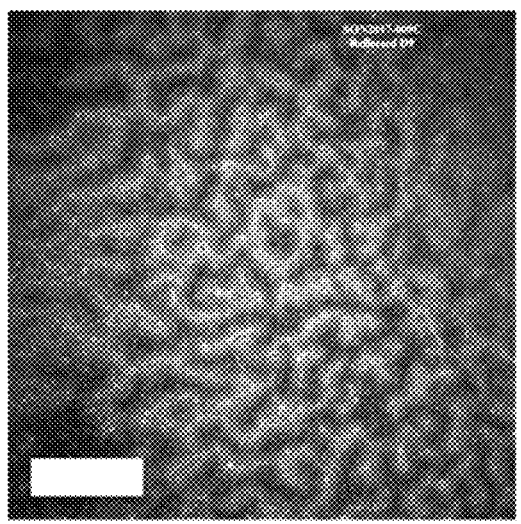
Figure 3C:
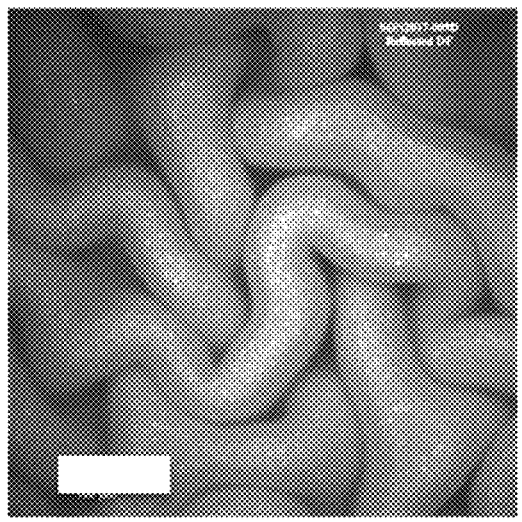

The described inventive method was also adapted to create textured and porous PVDF films from organic polymeric films having different dry thicknesses. By increasing the original dry organic polymeric film thickness, the average wrinkle wavelength and amplitude (average peak to valley height) of the resulting textured and porous organic polymeric films increased significantly, as shown in the optical micrographs of FIGS. 3A, 3B, and 3C (scale bars for the images are 500 μm; dry film thicknesses for the original organic polymeric films were 25 μm, 50 μm, and 75 μm, respectively).

Figure 4A:
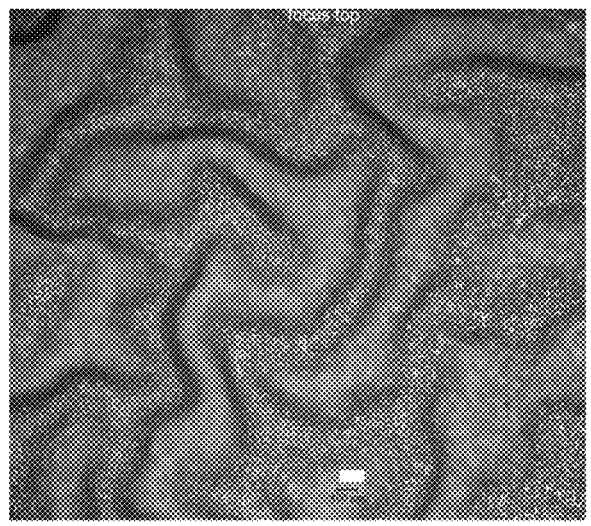
FIGS. 4A, 4B, and 4C are black-and-white optical micrographs of textured and porous organic polymeric films obtained according to the present invention as described in Invention Example 1 below.
Figure 4B:
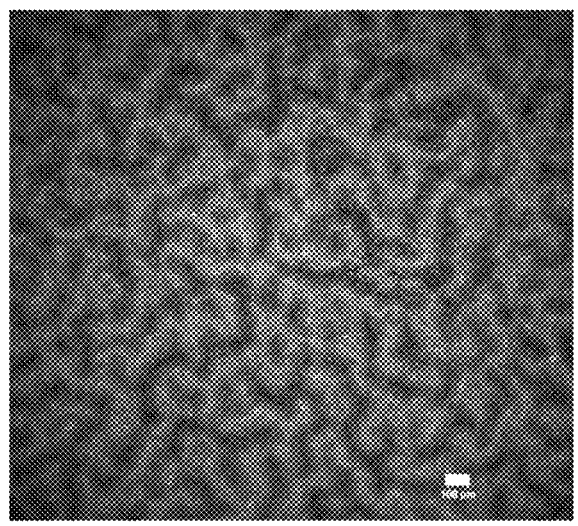
Figure 4C:
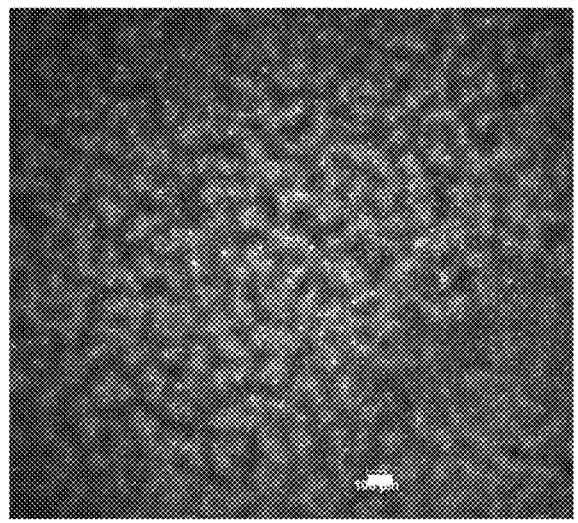

The described inventive method was also adapted to use different applied physical forces to create textured and porous PVDF films according to the present invention. By increasing the magnitude of the physical force applied to the opposing surfaces of the organic polymeric films, the wrinkle (textured) wavelength and amplitude (peak to valley height) of the resulting textured and porous films also increased significantly, as shown in the optical micrographs of FIGS. 4A, 4B, and 4C (applied forces of 0.2 N, 0.65 N, and 1.11 N, respectively).

INVENTION EXAMPLE 2

Formation of a Textured and Porous PVDF Film Using a Rolled Film Conformation A method was carried out similarly to that of Invention Example 1 in a stainless-steel high-pressure vessel using a dry 25 μm PVDF film but with a modification to the conformation of the PVDF film in the high-pressure vessel. Specifically, a PVDF film was sandwiched between commercially available Kapton sheets and the PVDF film and sheets were rolled together to provide a rolled article with a cylindrical conformation that was housed inside the high-pressure vessel, with the rolled article having a common symmetry axis as the cylindrical high-pressure vessel. The Kapton sheets provided less than 0.1 N physical force to the PVDF film. The high-pressure vessel was sealed and filled with $CO_2$ gas under pressure that was maintained at 120 ±2 bar over the course of the experiment. The temperature inside the high-pressure vessel was monitored and maintained at 100° C. for 2 hours. Subsequently, the high-pressure vessel was rapidly depressurized (at approximately 120 bar/second) by opening a valve to release the contained $CO_2$, and it was rapidly cooled with running cold (at approximately 10° C.) tap water. The Kapton sheets were removed to reveal an opaque textured and porous organic polymeric film having surface wrinkles with an average peak to valley height of about 450 μm and an estimated porosity of about 25%.

INVENTION EXAMPLE 3

Figure 5A:
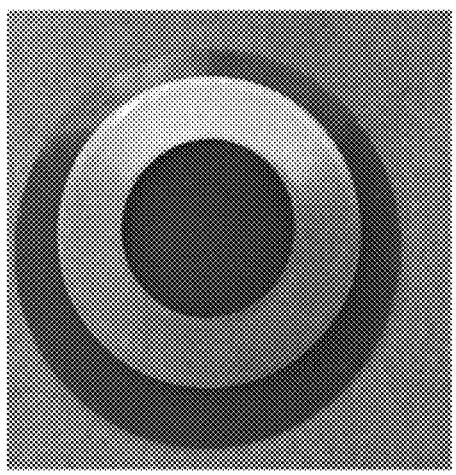
FIGS. 5A, 5B, and 5C are black-and-white images of molds used to sandwich dry PVDF films for the inventive method described below in Invention Example 3
Figure 5D:
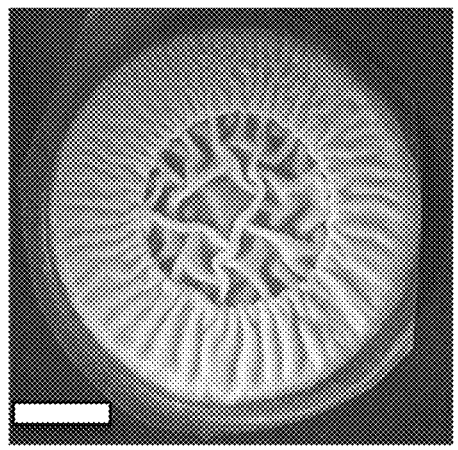
FIGS. 5D, 5E, and 5F are oblique angle macrographs of the resulting textured and porous organic polymeric films as described in Invention Example 3 below using the molds of FIGS. 5A, 5B, and 5C, respectively.

Formation of Textured and Porous PVDF Films Using Different Plane Shapes to Induce Different Wrinkle Patterns A method of this invention was carried out similarly to that of Invention Example 1 in a stainless-steel high-pressure vessel and a dry 50 μm PVDF film while it was sandwiched between an "O-ring-like" washer and a Kapton sheet housed inside the high-pressure vessel (see "mold" pattern provided in FIG. 5A). The PVDF film was kept parallel to the cross-section of the cylindrical high-pressure vessel. Standard weights were applied to first opposing surface of the PVDF film to provide 1.11 N physical force. The high-pressure vessel was sealed and filled with $CO_2$ gas under pressure so that the pressure inside the vessel was maintained at 120±2 bar over the course of the experiment. The temperature inside the high-pressure vessel was monitored and maintained at 100° C. for 2 hours. Subsequently, the high-pressure vessel was rapidly depressurized (at approximately 120 bar/second) by opening a valve to release the contained $CO_2$ and rapidly cooled with running cold (at approximately 10° C.) tap water. The applied physical force was then removed to obtain an opaque textured and porous organic polymeric film containing a radially oriented wrinkle pattern as shown in FIG. 5D, wherein the surface wrinkles had an average peak to valley height of about 0.5 to 1.5 mm and the porosity was about 70%.

Figure 5B:
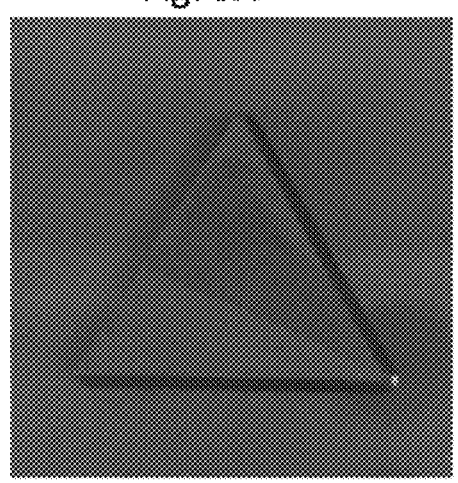
Figure 5E:
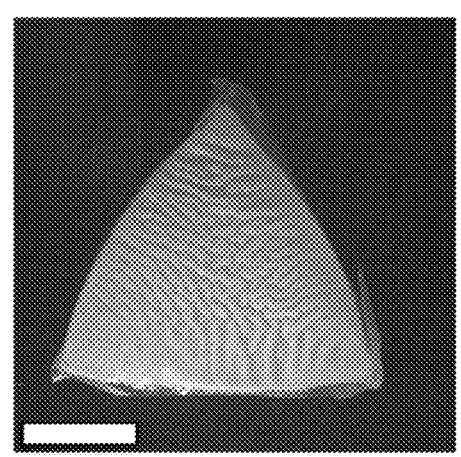
Figure 5C:
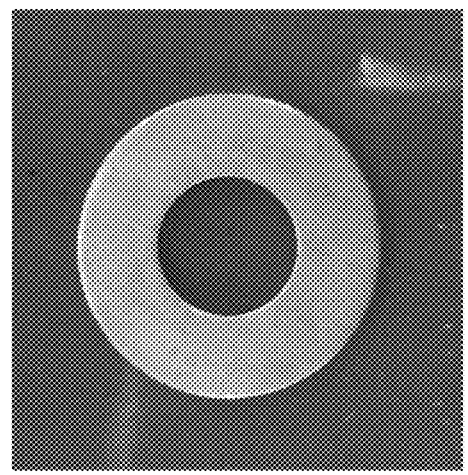
Figure 5F:
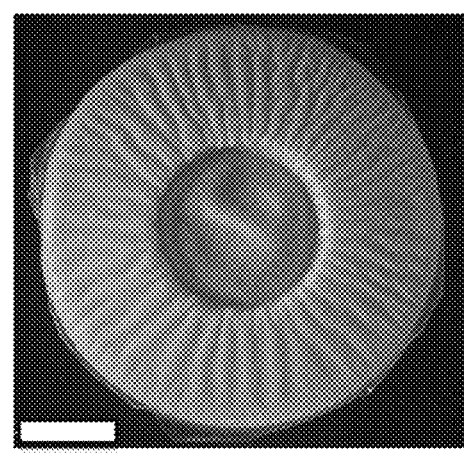

This inventive method was modified to create different wrinkle patterns in textured and porous PVDF films by using different molds (see FIGS. 5B and 5C) to sandwich the original PVDF films. FIGS. 5E and 5F show the textured patterns obtained in the textured and porous organic polymeric films after these experiments.

INVENTION EXAMPLE 4

Formation of a Textured and Porous PMMA Film

Figure 6A:
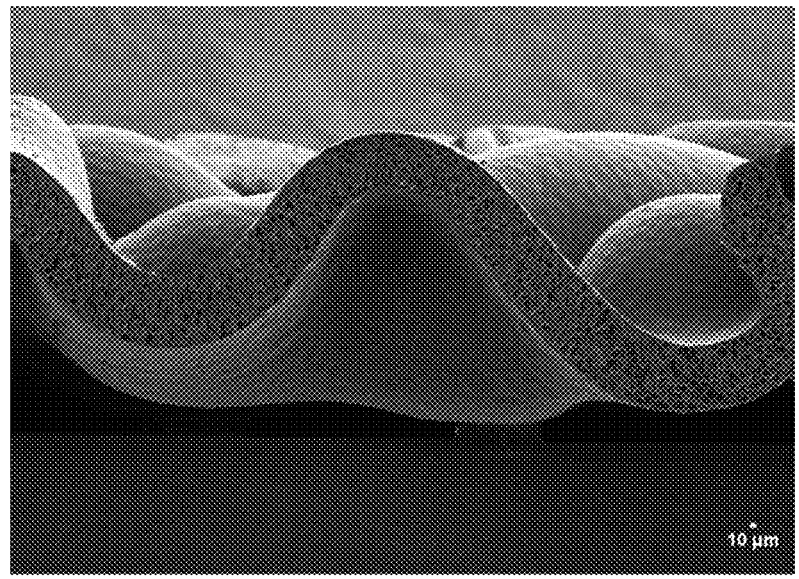
FIGS. 6A and 6B are black-white scanning electron micrographs of textured and porous organic polymeric films obtained according to the present invention as described in Invention Example 4 below.
Figure 6B:
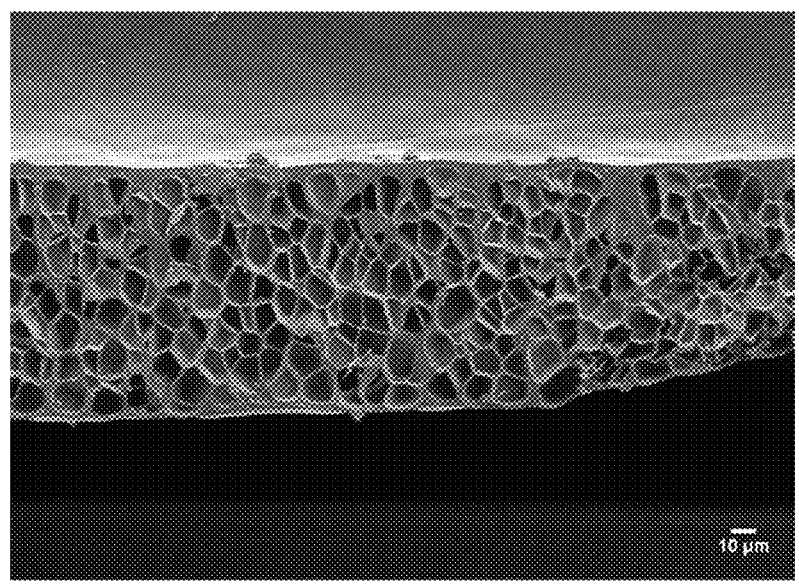

The method of this invention was carried out by swelling a poly(methyl methacrylate) film in a stainless-steel high-pressure vessel similarly to the method described in Invention Example 1. A dry 50 μm PMMA film was foamed using the scCO$_2$ foaming process described above while the PMMA film was sandwiched between parallel plates inside the high-pressure vessel with the PMMA film being parallel to the cross-section of the cylindrical high-pressure vessel. Standard brass weights were added to the first opposing surface of the PMMA film to provide 1.11 N physical force. The high-pressure vessel was sealed and filled with CO$_2$ gas under pressure and the pressure was maintained inside the vessel at 120±2 bar over the course of the experiment. The temperature inside the high-pressure vessel was monitored and maintained at 100° C. for 2 hours. Subsequently, the high-pressure vessel was rapidly depressurized (at approximately 120 bar/second) by opening a valve to release the contained carbon dioxide, and then rapidly cooled with running cold tap water (at approximately 10° C.). The applied physical force was removed to obtain an opaque textured and porous organic polymeric film (see cross-sectional images in FIG. 6A showing the details of wrinkles, and FIG. 6B showing the closed pores) wherein the surface wrinkles had an average peak to valley height of about 140 um and the porosity was about 50%.

The invention has been described in detail with particular reference to certain preferred embodiments thereof, but it will be understood that variations and modifications can be effected within the spirit and scope of the invention.

The invention claimed is:

1. A method for providing a textured and porous polymeric film, comprising the steps of, in order:
   A) providing an organic polymeric film having first and second opposing surfaces and a dry thickness of less than 1 mm, and that is composed of a material that is swellable with supercritical carbon dioxide;
   B) applying a physical force to at least a partial surface area of both the first and second opposing surfaces of the organic polymeric film of at least 0.05 Newtons;
   C) subjecting the organic polymeric film to supercritical carbon dioxide under a pressure of at least 73 bar and a temperature of at least 31° C. for a time sufficient to swell the organic polymeric film with the supercritical carbon dioxide;
   D) removing the supercritical carbon dioxide; and
   E) after D) has begun or has been completed, removing the physical force from the at least partial surface area of both the first and second opposing surfaces,
   to provide a textured and porous organic polymeric film having:
   a) textured first and second opposing surfaces in the at least partial surface area, having wrinkles having an average peak to valley height of at least 1 μm and up to and including 3,000 μm, and
   b) a porosity of at least 10% provided by pores between the first and second opposing surfaces, the porosity being based on the total final volume of the textured and porous organic polymeric film.

2. The method of claim 1, wherein the textured and porous organic polymeric film is cooled to a temperature that is less than the temperature used in C).

3. The method of claim 1, wherein the organic polymeric film is disposed on a substrate that is not swellable by supercritical carbon dioxide under the conditions of C).

4. The method of claim 1, wherein the organic polymeric film is composed of one or more amorphous or semi-crystalline polymers.

5. The method of claim 1, wherein the organic polymeric film is composed of poly(vinylidene fluoride) or a copolymer derived in part from vinylidene fluoride, an acrylate homopolymer or copolymer, a polycarbonate, a polyurethane, or a blend of two or more of such polymers.

6. The method of claim 1, wherein the organic polymeric film is a composite composed of one or more organic polymers and an inorganic or organic filler material.

7. The method of claim 1, wherein the textured and porous organic polymeric film comprises both open pores and closed pores.

8. The method of claim 1, wherein the textured and porous organic polymeric film comprises predominantly closed pores.

9. The method of claim 1, wherein the organic polymeric film comprises a single organic polymeric layer.

10. The method of claim 1, wherein the organic polymeric film comprises a laminate of two or more organic polymeric films of different composition.

11. The method of claim 1, wherein the textured first and second opposing surfaces in the at least partial surface area have wrinkles having an average peak to valley height of at least 25 μm and up to and including 1500 μm.

* * * * *